April 28, 1964     T. S. SPRAGUE     3,130,713

HORIZONTAL VAPOR GENERATING UNIT

Filed March 28, 1960     2 Sheets-Sheet 1

INVENTOR.
Theodore S. Sprague
BY
ATTORNEY

April 28, 1964     T. S. SPRAGUE     3,130,713

HORIZONTAL VAPOR GENERATING UNIT

Filed March 28, 1960     2 Sheets-Sheet 2

*INVENTOR.*
Theodore S. Sprague

BY

ATTORNEY

United States Patent Office 3,130,713
Patented Apr. 28, 1964

3,130,713
HORIZONTAL VAPOR GENERATING UNIT
Theodore S. Sprague, Hudson, Ohio, assignor to The Babcock & Wilcox Company, New York, N.Y., a corporation of New Jersey
Filed Mar. 28, 1960, Ser. No. 17,870
6 Claims. (Cl. 122—32)

This invention relates in general to a horizontal vapor generating unit, and more particularly, it relates to a shell and tube type generating unit in which the heat is supplied by a hot fluid flowing within the tubes. In modern day industries such as petroleum refining, chemical manufacture and the utilization of atomic energy, there are available high temperature fluids from which heat may be extracted for useful purposes to improve the economy of a particular operation. Such a useful purpose is the generation of steam.

In some of these processes it is particularly advantageous to have a compact vapor generator because the space into which it must be fitted is limited. Preferably such vapor generating units should be capable of transferring heat at a comparatively high rate and at the same time should be capable of withstanding large temperature gradients thereby relieving stresses induced by differential thermal expansion. Furthermore, with high rates of heat transfer, the generator unit must have adequate circulation of the heated fluid under all loading conditions to assure proper continuity of operation. Also, care must be taken to assure proper mixing of the incoming feedwater and water treatment chemicals with the boiling fluid in the vapor generator to prevent corrosion of the metal or the concentration of scale or solids on the tube surfaces. It is recognized that these will increase the possibility of tube failures and thus limit the capacity and/or life of the vapor generator.

The horizontal vapor generators as known in the prior art have, in general, been directed to low pressure and low temperature applications and low thermal output capacities. In such application consideration of feedwater contaminants, chemical treatment of feedwater, problems of differential thermal expansion of the pressure parts, and steam generation rates in the tube bundle have not been critical factors in the design and operation of the unit. Thus with processes providing large quantities of heat capable of producing large amounts of high temperature, high pressure steam, horizontal vapor generators of the prior art are incapable of sustained, satisfactory operation because they lack the above named provisions which make such operating conditions possible.

In recent years indirectly heated vapor generators have been improved to meet the requirements as cited above. An example of such vapor generators, or boilers, is provided by those in the Shippingport reactor plant, and described in Patent No. 2,904,013, which are comprised of horizontal tube heated evaporators connected to a separate vapor-liquid drum by risers and downcomers. However, the nature of these boilers is such that they require a fairly large amount of room, in that the space between the horizontal evaporator and the vapor-liquid drum is largely unoccupied. Such units require a multiplicity of riser and downcomer piping to convey the steam-water mixture to the drum and to return the separated liquid to the heat exchanger. In these boilers the multiplicity of heavy walled pressure piping presents thermal flexibility problems.

The present invention is directed to a vapor generating unit which is completely contained within a single pressure vessel wherein there is defined apparatus which distinctly determines the flow paths of the vaporizable fluid and which provides for the generation and separation of the vapor therein. Thus, with the present invention it is possible to obtain a steam output of 1,000,000 pounds per hour from a generator taking up the same volume of space as the Shippingport generator described above which has a continuous rating of only 287,000 pounds of steam per hour.

Accordingly, the present invention provides a horizontal indirectly heated vapor generator comprising a horizontal pressure vessel containing a vaporizable liquid having a liquid level separating an upper vapor space from a lower liquid space, a U-shaped tube bundle disposed in the liquid space, a baffle means defining a generating chamber immediately surrounding the tube bundle conjointly forming flow spaces exterior of the generating chamber, with the generating chamber open at the top and bottom of the tube bundle to the liquid space and having a uniform cross section throughout the length of the tube bundle to provide uniform liquid flow and vapor generation therein.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which we have illustrated and described the preferred embodiments of the invention.

Figure 3:
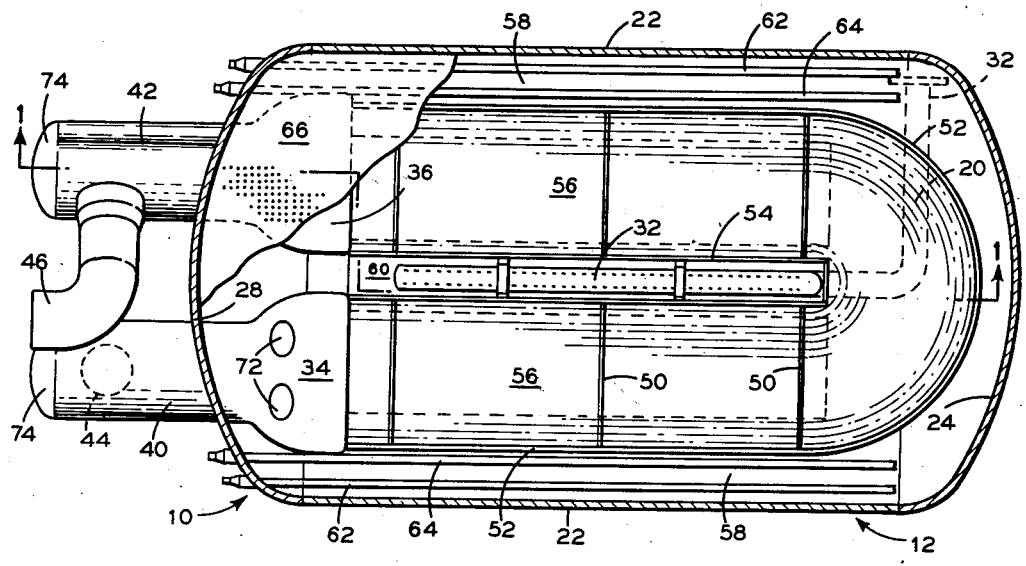
FIG. 3 is a plan view of the boiler taken along line 3—3 of FIG. 1.
Figure 1:
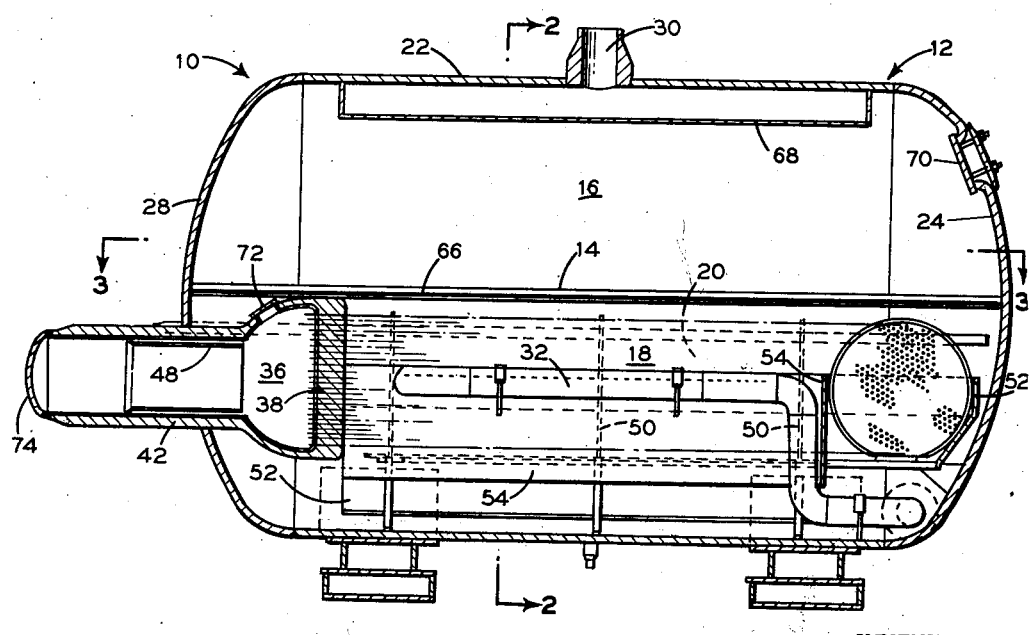
FIG. 1 is an elevation in section of the present invention.

In FIG. 1 there is shown a side of the indirectly heated vapor generator 10. This horizontal vapor generator comprises a pressure vessel 12 adapted to contain a body of vaporizable liquid having a liquid level 14 separating an upper vapor space 16 from a lower liquid space 18. A multiplicity of U-shaped tubes 20 from a U-shaped tube bundle which is disposed horizontally in the liquid space 18 and is adapted to indirectly heat the vaporizable liquid by a heated fluid flowing therethrough.

The pressure vessel 12 is formed of a horizontal cylindrical section 22 closed at both ends by elliptical heads 24 and 28. A vapor outlet 30 is positioned in the upper portion of the cylindrical section 22 in connection with the vapor space 16. A feedwater inlet line 32 enters the lower portion of the cylindrical section and extends into the lower liquid space 18 and will be more thoroughly described hereinbelow.

The U-shaped tube bundle of circular cross section, is composed of a plurality of U-tubes 20 disposed in the lower, or liquid space 18 of the pressure vessel. The bend of the U-shaped bundle is disposed adjacent one head 24 of the pressure vessel and the legs of the bundle extend to the opposite end, terminating in inlet and outlet headers 34 and 36, respectively. The inlet and outlet headers are hemispherical with a flat tube sheet 38. They are served by inlet and outlet pipes 40 and 42, respectively, which extend through the head 28 of the pressure vessel and by connections 44 and 46, provide the fluid flow path for the heated fluid. The inlet and outlet pipes 40 and 42, are provided with internal thermal sleeves 48 where the pipes pass through the pressure vessel head 28 to protect this head from thermal shocks occasioned by differences in the temperature of the heating and heated fluids. The inlet and outlet pipes are integrally attached to the pressure vessel head 28 and differential thermal expansion between the tube bundle and the pressure vessel 12 is accommodated by the expansion of the tube bundle, on supports 50, toward the opposite pressure vessel head 24.

Figure 2:
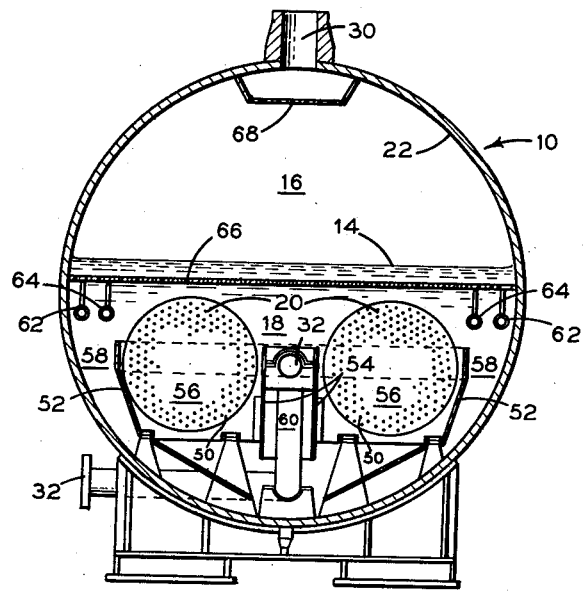
FIG. 2 is an end view of the present invention taken along line 2—2 of FIG. 1.

U-shaped baffles 52 and 54, lying in a generally vertical plane, immediately surround the tube bundle and conjointly form a generally U-shaped vapor generating chamber 56 and flow spaces, 58 and 60, exterior of the generating chamber (see FIG. 2). The outer baffle 52 adjacent to the outer periphery of the tube bundle extends continuously from one tube sheet 38 of the inlet headers 34 to the similar tube sheet of header 36, thus forming the outer flow space 58 between the baffle and the pressure vessel wall and head, 22 and 24, respectively. The inner baffle 54 is disposed between and adjacent to the legs of the U-shaped tube bundle to form the inner flow space 60 between the legs of the baffle. Both baffles extend vertically from a horizontal plane subjacent the tube bundle 20 to a horizontal plane disposed between the liquid level 14 and the horizontal centerline of the tube bundle. The outer baffle 52 further extends below the lower horizontal plane in a substantially parallel relationship with the pressure vessel wall 22 to a position subjacent the lower extremity of the inner baffle 54, thereby forming an opening between the flow passages 58 and 60, and the vapor generating chamber 56. The vapor generating chamber formed around the tube bundle by the baffles has a substantially uniform cross section throughout the length of the tube bundle and is open at the top and bottom to the liquid space 18.

The feedwater inlet line 32 enters the pressure vessel in the lower portion of the liquid space 18 near one end 24 thereof. The inlet line is arranged so as to be horizontally disposed in the upper portion of the inner flow space 60, as shown in FIGS. 1 and 2. The end of the feed line is capped and the line has a plurality of openings provided in the horizontal run of the inlet line to distribute the incoming feedwater along the length of the flow space 60.

Chemical feed lines 62 and blowdown lines 64 are pipes positioned in the upper portion of the outer flow spaces 58. The chemical feed lines permit the addition of water treatment chemicals and are more thoroughly described hereinbelow. The blowdown lines permit the extraction from the pressure vessel of liquid containing a high proportion of solids therein.

A perforated triple plate baffle 66 is disposed in the pressure vessel between the top of the tube bundle and the liquid level 14, preferably just beneath the liquid level. This baffle consists of a plurality of horizontal plates arranged in parallel relationship with each other and parallel to the liquid surface. Each plate has a multiplicity of holes therethrough which are offset from the holes in the adjacent plates, thus forming a sinuous flow path for the steam-water mixture rising from the generating chamber. This perforated plate baffle extends under the entire surface of the liquid within the confines of the interior of the pressure vessel. It assists in the release of the steam from the water by providing a uniform flow resistance subjacent the liquid level to distribute the steam coming from the tube bundle uniformly throughout the entire disengaging surface of the liquid, and thus promotes effective separation of the steam from the up-flowing steam-water mixture.

To assure dry steam leaving the outlet nozzle 30, a means 68 for removing liquid entrained in the steam is disposed between the outlet 30 and the vapor space 16. Such a means may be a steam scrubber or a dry-pan, both of which are well known in the art. The steam scrubber, for example, is comprised of a plurality of angular members closely arranged to force the outgoing vapor to suddenly change direction and thus separate out any entrained liquid.

Access for observation or for general maintenance within the interior of the pressure vessel 12 is provided by a manway 70. Also, access may be gained to the interior of the inlet and outlet headers, 34 or 36, from the interior of the pressure vessel via header handholes 72, provided therein, or from outside of the pressure vessel through removable heads 74 at the outer ends of the inlet and outlet pipes 40 and 42. Thus, maintenance of the pressure vessel and of the tube bundle and the associated headers is facilitated.

In operation the vapor generator is connected to a source of heated primary fluid via connections 44 and 46. The heated fluid flows into the tube bundle through the inlet connection 44, the inlet pipe 40, and the inlet header 34, and thence through the U-tube bundle where it releases heat via indirect heat transfer to the liquid in the generating chamber 56 surrounding the tube bundle. The primary fluid then leaves the tube bundle via the outlet header 36, the outlet pipe 42, and the outlet connection 46, to return to the source of heat to complete the cycle.

The liquid in the generating chamber 56 which surrounds the tube bundle is heated by the fluid passing through the tubes and partially vaporized so that it rises to the upper portion of the liquid space 18 (see FIG. 2). Upon reaching the perforated baffle 66 and the liquid level 14 the vapor separates from the liquid and enters the vapor space 16. The vapor then passes through the scrubber 68, where any entrained liquid in the vapor is removed, and passes out through the outlet nozzle 30 to be utilized for generating electricity or in a process requiring such vapor. After releasing the vapor, the liquid then starts to flow downward into the flow spaces 58 and 60. The liquid flowing through the inner flow space 60 is mixed with the feedwater introduced through the inlet line 32 and flows to the lower extremity of the inner baffle 54. The liquid flowing through the outer flow spaces 58 may have the entrained solids removed via the blowdown lines 64. It may also be mixed with water treatment chemicals which are introduced via the chemical feed lines 62. The liquid flows to the lower extremity of the outer baffle 52 where it mixes with the liquid flowing down the inner flow space 60 and enters the generating chamber 56 through the opening between the lower extremities of the inner and outer baffles to complete the flow cycle.

While water and steam are here referred to as the liquid and vapor contained within the pressure vessel, it should be understood that other vaporizable fluids may be used to advantage as well. Further, the U-shaped tube bundle has been illustrated as having equi-length legs, however, certain applications may require the use of a tube bundle having legs of different lengths.

To obtain a high capacity integral vapor or steam generator several major factors must be provided for. These factors include the necessity for providing the proper liquid circulation and the maintenance of a closely controlled liquid level. The close level control serves a dual purpose in that it provides a reserve of vaporizable liquid which is available in case of a sudden increase in load on the vapor generator and it provides a definable height of steam free liquid within the water space of the unit which contributes to the maintenance of the high circulation rates necessary in such high duty steam generators.

Besides the above, the high circulation rate in the vapor generator depends upon the differential head for providing flow occasioned by the difference in density of the water in the downflowing leg of the circulation circuit and that of the lighter steam-water mixture in the upflowing leg of the circulation circuit plus the efficiency of separation of the steam from the water.

The differential density head is provided in the present invention by the separate and distinct fluid flow paths formed by the baffles around the tube bundle. The downflowing legs, 58 and 60, are those exterior of the generating chamber 56, which is the upflowing leg. The introduction of the feedwater in the inner flow space 60 increases the density of the downflowing fluid due to its lower temperature and, therefore, improves the differential density characteristic.

The efficiency of the separation of the steam and water is provided by the use of the perforated triple plate baffle in combination with the large vapor disengaging surface at the liquid level. The perforated baffle promotes the uniform disengagement of the steam throughout the large liquid surface which, in turn, makes it possible to obtain substantially dry steam leaving the body of liquid. This is true since the amount of steam disengaged per unit area of the liquid surface is relatively small.

It has also been found that accelerated corrosion can occur in zones where nucleate boiling ceases and film boiling begins. Similarly, rapid corrosion has occurred in high heat input zones as a result of hideout of boiler water chemicals where flow stagnation was present.

In order to prevent the above-named difficulties it is necessary to provide an adequate, uniform flow of liquid over the entire tube bundle. The present invention provides an indirectly heated vapor generator having a steam generating chamber of substantially constant cross section surrounding the tube bundle and having a uniformly distributed flow therein. Baffle means are also provided which direct the fluid flow into and out of the generating chamber to provide positive circulation throughout all portions of the pressure vessel and, more particularly, through the generating chamber. The inner baffle also protects the pressure vessel from thermal shocks by causing the incoming feedwater to mix with boiler water and be warmed by it before it reaches the drum shell. In addition, the baffles promote mixing of the boiler water and feedwater within the drum to prevent stagnation.

The proper introduction of the feedwater with respect to the baffles is also very important in the chemical treatment of the boiler water. In any feedwater there are traces of dissolved solids, some of which may be scale forming. The feedwater is introduced so the incoming feedwater will be mixed with the treated boiler water before it reaches the heated U-tubes. This gives the chemicals in the boiler water an opportuinty to react with the scale forming agents in the feedwater and render them harmless.

The chemical feed lines replenish the water treatment chemicals in the boiler water which are used up in treating the incoming feedwater and are particularly located in the flow spaces 58 provided by the baffles. To prevent the formation of insoluble solids the water treatment chemicals should be introduced and thoroughly mixed with the boiler water before coming into contact with the incoming feedwater. This is accomplished by locating the chemical feed lines in the upper portion of the outer flow spaces, which assures good mixing of the chemicals with the boiler water before reacting with the feedwater.

Boiler water blowdown lines are also located in a particular relationship with the baffle formed flow spaces to facilitate removal of high solids concentration water. Thus, the water is preferably removed prior to the addition of water treatment chemicals. Again, these lines are optimally located in the upper portion of the outer flow spaces to attain the desired reduction in boiler water concentrations.

The use of the perforated triple plate baffle just below the water level and the steam scrubber at the steam outlet in combination with the positive flow paths formed by the baffles and the relative positions of the water level and the tube bundle in the pressure vessel makes possible natural separation of the steam from the boiler water. The perforated baffle distributes the steam arising from the tube bundle uniformly across the surface of the water level and thus facilitates the steam-water separation. The use of the steam scrubbers or the dry-pan in the upper portion of the steam space over the outlet nozzle opening assures dry steam at the outlet nozzle.

The location of the tube sheets within the water space reduces the thermal stresses imposed thereon. With steady load conditions, the header and tube sheet are immersed in water whose temperature is at saturation corresponding to the pressure within the vessel. It is to be noted that the ring of metal circumscribing that portion of the tube sheet which contains the tube holes will be maintained at substantially the same temperature as that of the saturated liquid. This cooler ring produces a hoop effect which tends to restrain the tube sheet from radial expansion and reduces the thermal stress on the cooler, high thermal gradient side of the tube sheet. This results in a lower maximum thermal stress than would be the case if the tube sheet were exterior of the liquid space. Positioning the tube sheets within the liquid space, with the baffles to direct the flow across the tube sheets, tends to prevent collection of solids thereon.

Further features of the present invention are realized from the combination, within a single, large pressure vessel of a tube bundle and asociated baffles. Also, the large steam space above the water level aids in the separation of steam from water and in the absorption of water-swell during rapid power level transients. Furthermore, the large pressure vessel permits access to and observation of, the tube bundle which would not be possible with other types of steam generators.

While in accordance with the provisions of the statutes I have illustrated and described herein the best form and mode of operation now known to me, those skilled in the art will understand that changes may be made in the form of the apparatus disclosed without departing from the spirit of the invention disclosed by my claims, and that certain features of my invention may sometimes be used to advantage without a corresponding use of other features.

What is claimed is:

1. A horizontal indirectly heated boiler comprising a horizontally elongated pressure vessel containing a vaporizable liquid, means for maintaining a liquid level in said pressure vessel defining a lower liquid space and an upper vapor space, a tube bundle disposed horizontally in said liquid space and extending along the major portion of the length of said pressure vessel, a vapor outlet disposed in communication with said vapor space of said pressure vessel, a horizontally extending perforated baffle means disposed immediately subjacent said liquid level and extending across said pressure vessel, and baffle means extending along the outer sides of said tube bundle and spaced from said pressure vessel wall defining a vapor generating chamber immediately surrounding said tube bundle and a plurality of flow spaces exterior of said generating chamber, said baffle means having walls extending from a horizontal plane subjacent said tube bundle substantially to a horizontal plane disposed between the top and the center line of said tube bundle so that said generating chamber has an unobstructed upward discharge to said perforated baffle means, said generating chamber open at the bottom to said liquid space and having a substantially uniform cross section throughout the length of said tube bundle to provide uniform liquid flow and vapor generation therein.

2. A horizontal indirectly heated boiler comprising a horizontally elongated pressure vessel containing a vaporizable liquid, means for maintaining a liquid level in said pressure vessel defining a lower liquid space and an upper vapor space, a vapor outlet disposed in communication with said vapor space of said pressure vessel, a U-shaped tube bundle disposed horizontally in said liquid space and extending along the major portion of the length of said pressure vessel, a horizontally extending perforated baffle means disposed immediately subjacent said liquid level and extending across said pressure vessel, and baffle means extending along the outer sides of said tube bundle and spaced from said pressure vessel wall defining a generally U-shaped vapor generating chamber immediately surrounding said tube bundle and a plurality of flow spaces exterior of said generating chamber, said baffle means having walls extending from a horizontal plane subjacent said tube bundle substantially to a horizontal plane disposed between the top and the center line of said tube bundle so that said generating chamber has an unobstructed upward discharge to said perforated baffle means, said generating chamber open at the bottom to said liquid space and having a substantially uniform cross section throughout the length of said tube bundle to provide uniform liquid flow and vapor generation therein.

3. A horizontal indirectly heated boiler comprising a horizontally elongated pressure vessel containing a vaporizable liquid, means for maintaining a liquid level in said pressure vessel defining a lower liquid space and an upper vapor space, a U-shaped tube bundle disposed horizontally in said liquid space and extending along the major portion of the length of said pressure vessel, said U-shaped tube bundle arranged with the legs thereof disposed in a common substantially horizontal plane, a horizontally extending perforated baffle means disposed immediately subjacent said liquid level and extending across said pressure vessel, baffle means extending along the outer sides of said tube bundle and spaced from said pressure vessel walls defining a generally U-shaped vapor generating chamber immediately surrounding said tube bundle and a plurality of flow spaces exterior of said generating chamber, said baffle means having walls extending from a horizontal plane subjacent said tube bundle substantially to a horizontal plane disposed between the top and the center line of said tube bundle so that said generating chamber has an unobstructed upward discharge to said perforated baffle means, said generating chamber open at the bottom of said tube bundle to said liquid space and having a substantially uniform cross section throughout the length of said tube bundle to provide uniform liquid flow and vapor generation therein, and a vapor outlet disposed in communication with said vapor space of said pressure vessel.

4. A horizontal indirectly heated boiler comprising a horizontally elongated pressure vessel containing a vaporizable liquid, means for maintaining a liquid level in said pressure vessel defining a lower liquid space and an upper vapor space, a vapor outlet disposed in communication with said vapor space of said pressure vessel, a U-shaped tube bundle disposed in said liquid space with the legs thereof disposed in a substantially horizontal plane, a horizontally extending perforated baffle means disposed immediately subjacent said liquid level and extending across said pressure vessel, a U-shaped baffle having walls disposed in a generally vertical plane immediately adjacent the outer periphery of said tube bundle and spaced from said pressure vessel to form a downflow space between said baffle and said pressure vessel, and a second U-shaped baffle having walls disposed in a generally vertical plane between the legs of said U-shaped tube bundle to form a second downflow space between the legs of said second baffle, said baffles cooperating to form a vapor generating chamber containing said tube bundle, said baffle walls extending from a horizontal plane subjacent said tube bundle substantially to a horizontal plane disposed between the top and the center line of said tube bundle so that said generating chamber has an unobstructed upward discharge to said perforated baffle means, said vapor generating chamber open at the bottom of said tube bundle to said liquid space and having a substantially uniform cross section throughout the length of said tube bundle to provide uniform liquid flow and vapor generation therein.

5. A horizontal indirectly heated boiler comprising a horizontally elongated pressure vessel containing a vaporizable liquid, means for maintaining a liquid level in said pressure vessel defining a lower liquid space and an upper vapor space, a vapor outlet disposed in communication with said vapor space of said pressure vessel, a U-shaped tube bundle disposed in said liquid space with the legs thereof disposed in a substantially horizontal plane, a horizontally extending perforated baffle means disposed immediately subjacent said liquid level and extending across said pressure vessel, a U-shaped baffle having walls disposed in a generally vertical plane immediately adjacent the outer periphery of said tube bundle and spaced from said pressure vessel wall to form a downflow space between said baffle and said pressure vessel, and a second U-shaped baffle having walls disposed in a generally vertical plane between the legs of said U-shaped tube bundle to form a second downflow space between the legs of said second baffle, said baffles cooperating to form a vapor generating chamber containing said tube bundle, said baffle walls extending from a horizontal plane subjacent said tube bundle substantially to a horizontal plane disposed between the top and the center line of said tube bundle so that said generating chamber has an unobstructed upward discharge to said perforated baffle means, said vapor generating chamber open at the bottom of said tube bundle to said liquid space and having a substantially uniform cross section throughout the length of said tube bundle to provide uniform liquid flow and vapor generation therein, and means for removing liquid entrained in said vapor disposed between said vapor outlet and said vapor space to provide liquid-free vapor to said outlet.

6. A horizontal indirectly heated boiler comprising a horizontally elongated pressure vessel containing a vaporizable liquid, means for maintaining a liquid level in said pressure vessel defining a lower liquid space and an upper vapor space, a vapor outlet disposed in communication with said vapor space of said pressure vessel, a U-shaped tube bundle disposed in said liquid space with the legs thereof disposed in a substantially horizontal plane, a horizontally extending perforated baffle means disposed immediately subjacent said liquid level and extending across said pressure vessel, a U-shaped baffle having walls disposed in a generally vertical plane immediately adjacent the outer periphery of said tube bundle and spaced from said pressure vessel wall to form a downflow space between said baffle and said pressure vessel, and a second U-shaped baffle having walls disposed in a generally vertical plane between the legs of said U-shaped tube bundle to form a second down flow space between the legs of said second baffle, said baffle cooperating to form a vapor generating chamber containing said tube bundle, said baffle walls extending from a horizontal plane subjacent said tube bundle substantially to a horizontal plane disposed between the top and the center line of said tube bundle so that said generating chamber has an unobstructed upward discharge to said perforated baffle means, said vapor generating chamber open at the bottom of said tube bundle to said liquid space and having a substantially uniform cross section throughout the length of said tube bundle to provide uniform liquid flow and vapor generation therein, a liquid inlet disposed in the upper portion of at least one of said downflow spaces, and means for removing liquid entrained in said vapor disposed between said vapor outlet and said vapor space to provide liquid-free vapor to said outlet.

References Cited in the file of this patent

UNITED STATES PATENTS

| | | |
|---|---|---|
| 964,359 | Zastrow | July 12, 1910 |
| 1,131,738 | Row | Mar. 16, 1915 |
| 2,302,993 | Graham | Nov. 24, 1942 |
| 2,499,302 | Emhardt | Feb. 28, 1950 |

FOREIGN PATENTS

| | | |
|---|---|---|
| 1,034,251 | France | Apr. 8, 1953 |